(12) United States Patent
Burchard et al.

(10) Patent No.: US 12,316,790 B2
(45) Date of Patent: May 27, 2025

(54) FAST ROBUST ORACLES VIA DECENTRALIZED AUTONOMOUS ORGANIZATIONS

(71) Applicant: Goldman Sachs & Co. LLC, New York, NY (US)

(72) Inventors: Paul Burchard, Jersey City, NJ (US); Andrew Phillips, New York, NY (US); Francis Giannaros, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 381 days.

(21) Appl. No.: 17/978,451

(22) Filed: Nov. 1, 2022

(65) Prior Publication Data

US 2023/0136446 A1    May 4, 2023

Related U.S. Application Data

(60) Provisional application No. 63/284,503, filed on Nov. 30, 2021, provisional application No. 63/263,867, filed on Nov. 10, 2021, provisional application No. 63/274,517, filed on Nov. 1, 2021.

(51) Int. Cl.
*H04L 9/00* (2022.01)
*H04L 9/32* (2006.01)

(52) U.S. Cl.
CPC .............. *H04L 9/50* (2022.05); *H04L 9/008* (2013.01); *H04L 9/321* (2013.01)

(58) Field of Classification Search
None
See application file for complete search history.

(56) References Cited

U.S. PATENT DOCUMENTS

| | | | |
|---|---|---|---|
| 11,803,849 B1 * | 10/2023 | Lawrence | G06Q 40/03 |
| 2017/0344988 A1 * | 11/2017 | Cusden | G06F 21/00 |
| 2019/0114182 A1 * | 4/2019 | Chalakudi | H04L 63/0442 |
| 2019/0251557 A1 * | 8/2019 | Jin | H04L 9/0637 |
| 2019/0305938 A1 * | 10/2019 | Sandberg-Maitland | H04L 9/085 |
| 2019/0394019 A1 | 12/2019 | Gao | |
| 2020/0074548 A1 * | 3/2020 | Aidoo | G06Q 20/383 |
| 2020/0225974 A1 | 7/2020 | Davis et al. | |
| 2020/0396302 A1 * | 12/2020 | Le | H04L 9/3247 |
| 2021/0203475 A1 | 7/2021 | Xiao | |
| 2021/0203754 A1 * | 7/2021 | Hao | H04L 67/145 |
| 2021/0342803 A1 * | 11/2021 | Yoo | G06Q 20/102 |

(Continued)

OTHER PUBLICATIONS

Wang et al. "A Novel Blockchain oracle Implementation Scheme Based on Application Specific Knowledge Engines" (Year: 2019).*

(Continued)

*Primary Examiner* — Younes Naji
(74) *Attorney, Agent, or Firm* — Fenwick & West LLP

(57) ABSTRACT

An oracle that is fast enough to publish data to the blockchain in a timely manner while remaining decentralized and robust to the failure of any one part. A blockchain node may receive data to introduce to the blockchain from the oracle, determine whether the data was provided by a primary party or parties designated as an oracle by a DAO. If so, the node may process the data from the one or more primary parties and introduce the processed data to the blockchain.

18 Claims, 4 Drawing Sheets

(56) References Cited

U.S. PATENT DOCUMENTS

2022/0269977 A1* 8/2022 Yu .......................... G06N 20/00

OTHER PUBLICATIONS

Circuit Copyright Blockchain: Blockchain-Based Homomorphic Encryption for IP Circuit Protection (Year: 2020).*
Blockchain and the emergence of Decentralized Autonomous Organizations (DAOs): An integrative model and research agenda (Year: 2020).*
PCT International Search Report and Written Opinion, PCT Application No. PCT/IB2022/060530, Feb. 6, 2023, 11 pages.
Wang, S. et al., "A Novel Blockchain Oracle Implementation Scheme Based on Application Specific Knowledge Engines," 2019 IEEE International Conference on Service Operations and Logistics, and Informatics (SOLI), Nov. 6-8, 2019, pp. 258-262.

* cited by examiner

FAST ROBUST ORACLES VIA DECENTRALIZED AUTONOMOUS ORGANIZATIONS

CROSS-REFERENCE TO RELATED APPLICATIONS

This application claims the benefit of U.S. Provisional Patent Application Nos. 63/274,517, filed Nov. 1, 2021, 63/263,867, filed Nov. 10, 2021, and 63/284,503, filed Nov. 30, 2021, all of which are incorporated by reference.

TECHNICAL FIELD

This disclosure relates generally to blockchain transactions and, in particular, to an oracle that is fast enough to publish data to the blockchain in a timely manner while remaining decentralized and robust to the failure of any one party.

BACKGROUND

Distributed ledgers were developed as a means for parties to engage in transactions, e.g., financial transactions, without the need for a single, trusted intermediary. In such systems, each transaction is recorded independently by several nodes (e.g., on a blockchain). In some implementations, no one entity controls all of the nodes so it is exceedingly difficult for a malicious actor to alter the transaction once it has been recorded by the nodes. Even in implementations where a single entity controls all of the nodes, it is still exceedingly difficult to alter the data recorded on sufficient nodes to change the consensus indicated by all of the nodes without leaving an indication that the data has been tampered with.

Blockchains are recognized as a technology that may enable decentralized finance. Since the calculations of a blockchain are internal, the injection of real-world data typically uses special smart contracts called oracles that provide this data to the blockchain for consumption by other smart contracts. Oracles are a method of introducing real world data into the blockchain as the basis for further calculations. Early oracles reintroduced centralization into the blockchain by relying on one trusted party to provide the data. Later, decentralized oracles were developed, which have consensus procedures around the data to be provided. Unfortunately, the need to achieve consensus drastically slows down the provision of the data, which may no longer be timely. In short, existing oracle solutions are either fragile due to reliance on one centralized party or slow due to the need to obtain consensus on the data published by the oracle.

SUMMARY

The above and other problems may be solved using a decentralized autonomous organization (DAO) to govern an oracle in a decentralized manner. Decentralized Autonomous Organizations are organizations governed by open code on a blockchain that governs membership and actions of the organization. The DAO may be used to designate at least one primary party to provide the oracle data in a timely manner. This party is generally a member of the DAO. If the designated party fails to be timely or provides incorrect data, the DAO can use its decision or voting procedures to replace the designated party with another one. Since this decision process is a slower one, the DAO can also designate a list of secondary parties which are automatically called upon if the designated primary party or parties are not timely or accurate.

In general, the DAO does not want just anyone making decisions about data that other smart contracts are relying on for accuracy. Thus, membership in the DAO may be permissioned such that the existing members can vet the capability of the designated party to provide the oracle data in an accurate and timely manner.

In one embodiment, to enable the oracle providers to get paid for their services, the primary oracle party provides the requested data to the blockchain in an encrypted form. Neither the private nor the so-called public key of the encryption scheme is made available to the public. Paying customers are given the so-called public key. When submitting a transaction to a smart contract that relies on the oracle data, to authenticate themselves to the contract, the paying customer also submits their blockchain address in encrypted form using the public key.

The encryption scheme used may be a fully homomorphic encryption scheme without errors but with homomorphism into nonstandard operations. The smart contract may make controlled use of a known plaintext attack to extract unencrypted information without revealing the private key. For example, the smart contract may use the known plaintext attack to authenticate a transaction by verifying that each bit of the submitted encrypted blockchain address matches the blockchain address of the party to the transaction or determine what the next action it should take is based on encrypted oracle data.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

An approach to creating and/or operating an oracle on a blockchain may achieves high speed by having a designated primary party or parties directly update the oracle values. The oracle may achieve robustness by having a DAO control the designation of the primary party or parties. The DAO may have decision procedures to replace the primary party or parties, in particular, if it or they consistently fail to provide timely and accurate oracle values.

Example Systems

Figure 1:
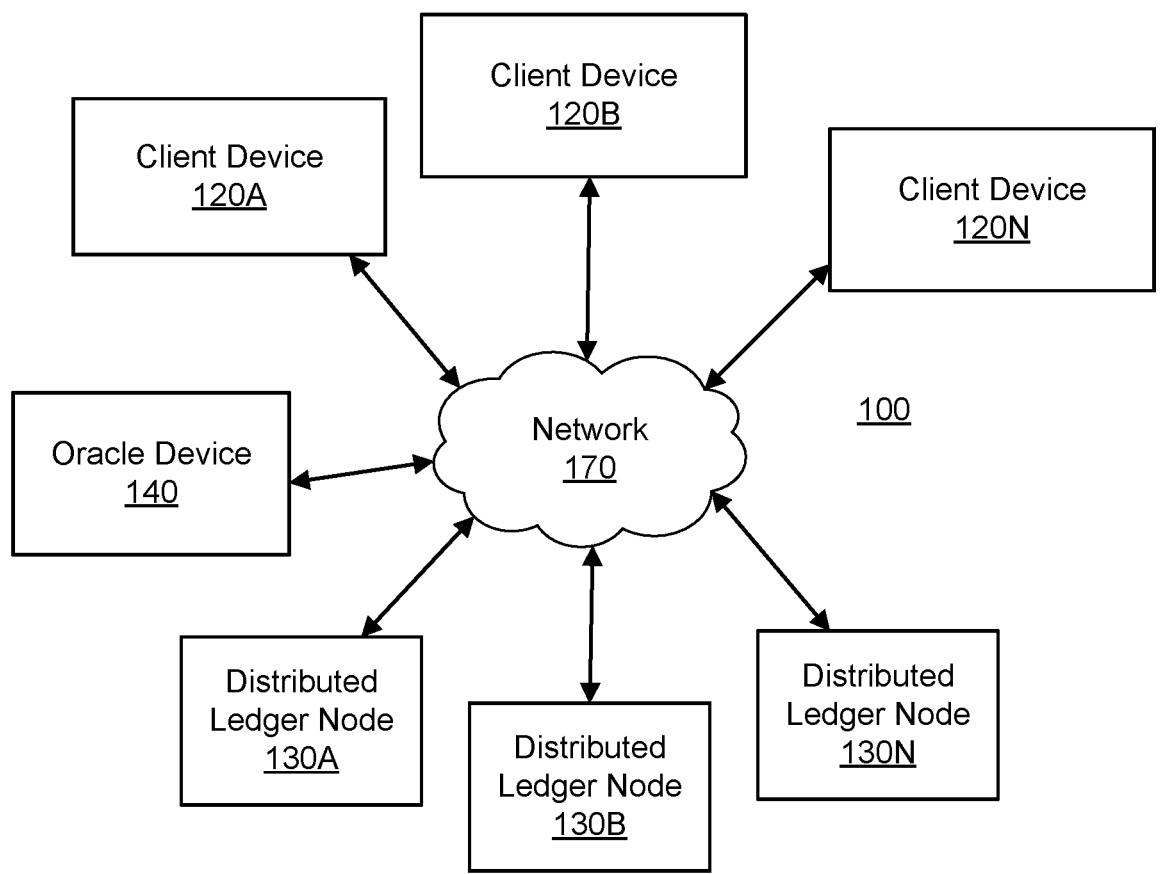
FIG. 1 illustrates a networked computing environment suitable for providing an oracle, according to one embodiment.

FIG. 1 illustrates one embodiment of a networked computing environment 100 suitable for providing an oracle using a DAO. In the embodiment shown, the networked computing environment 100 includes client devices 120A-N, distributed ledger nodes 130A-N, and an oracle device 140, all connected via a network 170. Although three client devices 120 and three distributed ledger nodes 130 are shown, the networked computing environment 100 may include any number of each type of device (and will typically contain many more of each). Similarly, there can be any number of oracle devices 140. In other embodiments, the networked computing environment 100 includes different or additional elements. In addition, the functions may be distributed among the elements in a different manner than described.

A client device 120 is a computing device with which a user (e.g., a member of prospective member of a DAO) may interact with the distributed ledger nodes 130. The interactions may include obtaining a token that indicates membership of the DAO (e.g., in exchange for providing value to an asset pool of the DAO), entering into and/or activating smart contracts on the blockchain, and/or making proposals to make changes to the DAO, etc. In one embodiment, the client device 120 provides a user interface (e.g., in an app or portal displayed via a web browser). Using the user interface, the user may submit and/or vote on proposals for the DAO. For example, proposals may include approving new members of the DAO. The voting power of each member may be equal or may be weighted by one or more factors (e.g., by being proportional to an amount of value contributed to the DAO's asset pool by the member).

One class of proposal enables the DAO to designate and remove primary parties. A designated primary party is a party that has been approved by the members of the DAO to provide information for an oracle. In some embodiments, designated primary parties are members of the DAO. Membership in the DAO may be permissioned so that the existing members of the DAO can vet prospective members for their ability to provide timely and accurate oracle values. In addition, the DAO can monitor the timeliness and/or accuracy of the data provided by the primary party or parties.

For further improved robustness, the DAO may designate a secondary party or parties to which the oracle automatically fails over if the primary party or parties breach timeliness or accuracy limits. These automated checks may include tests for whether the data is clearly wrong or out of range. The DAO may designate the secondary party or parties to provide the oracle data not just once, but for a recovery period that gives the primary parties a chance to fix whatever went wrong, after which the oracle automatically switches back to the primary parties. If the primary parties continue to fail, the DAO may use its decision procedures to replace them. It is not necessary for the primary parties and secondary parties to be disjoint; as long as the pool of secondary parties does not include any party that was a cause of the failure of the primaries.

The data provided by the primary party or parties may be processed before being delivered in response to data requests. In the case of multiple primary parties, where the data from different primary parties may not exactly agree, the oracle may provide an aggregation procedure to come up with a single final reported value. This can include taking the mean, or may involve more complicated analysis, such as dropping the highest and lowest values or values above/below upper and lower thresholds, respectively, before taking the mean. These aggregation procedures may provide robustness and also allow the construction of values where there is no single well-defined value, such as determining LIBOR rates.

Alternatively, when the data from multiple primary parties is expected to agree exactly, the data processing may be a load balancing wherein specific primary parties are designated to respond to specific data requests.

In one embodiment, to enable the oracle providers to get paid for their services, the primary oracle party provides the data to the blockchain in an encrypted form. Neither the private nor the so-called public key of the encryption scheme are made available to the public. Paying customers are given the so-called public key. When submitting a transaction to a smart contract that relies on the oracle data, the paying customer also submits their blockchain address in encrypted form using the public key to authenticate themselves to the smart contract.

The encryption scheme used may be a fully homomorphic encryption scheme without errors but with homomorphism into nonstandard operations (i.e., not ordinary addition and multiplication). Normally, such schemes without errors are considered insecure because they are susceptible to a known plaintext attack. However, there are two reasons to use them in smart contracts: (1) financial computations must be performed without errors, and (2) controlled used of the known plaintext attack may be applied to extract unencrypted information without revealing the private key in the smart contract. In this case, the so-called public key and the homomorphic operations are not made public to avoid bad actors from using the known plaintext attack themselves. Smart contract code may be obfuscated to avoid revealing the choice of homomorphic operations.

In some embodiments, the smart contract authenticates the transaction by using fully homomorphic encryption without errors and the known plaintext attack to verify that each bit of the submitted encrypted blockchain address matches the blockchain address of the party to the transaction. Fully homomorphic encryption without errors may be used to compute from the encrypted oracle data what the next action of the smart contract should be. The choice of action can be revealed by the smart contract using the known plaintext attack.

The distributed ledger nodes 130 are computing devices that record transactions in blocks on the blockchain and process requests (such as triggering provisions of smart contracts) as well as data provided for the oracle by primary parties (and secondary parties, when designated and called upon). Generally, when a request is submitted, distributed ledger nodes 130 individually determine whether to approve the request and/or what smart contract provisions may be triggered and a consensus algorithm (e.g., Byzantine fault tolerance) is used to determine whether a request is validated. However, in the case of oracles, data provided by a trusted entity (e.g., a primary or secondary party authorized by a DAO) may be added to the blockchain without the need for consensus.

An oracle device 140 is a computing device controlled by a primary (or secondary) party that provides data to the oracle, either automatically, in response to user input, or both. In one embodiment, the oracle device 140 periodically (e.g., hourly, daily, or weekly, etc.), on demand, or on submission by a designated party provides data indicating the current value of one or more parameters or variables of interest. For example, the data provided by an oracle device 140 may include weather data, a current price for one or more stocks, interest rates, sporting event results, locations of tracked assets, flight tracker data, and/or public transit schedules, etc. More generally, an oracle device 140 can provide any data from outside of the networked computing environment 100 that the DAO determines it is desirable to obtain. Furthermore, the data received from one or more oracle devices 140 may automatically trigger code within a smart contract. For example, a smart contract may automatically place a trade to buy or sell an asset if the current price drops below or rises above a respective threshold. As another example, code issuing alerts may be triggered if ingested weather data meets one or more conditions (such as a heat advisory issued to client devices 120 in a geographic area if the temperature in that area rises above a threshold). It should be appreciated that a wide range of functionality may be triggered by smart contracts on the blockchain in response to the oracle data meeting one or more criteria.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Example Methods

Figure 2:
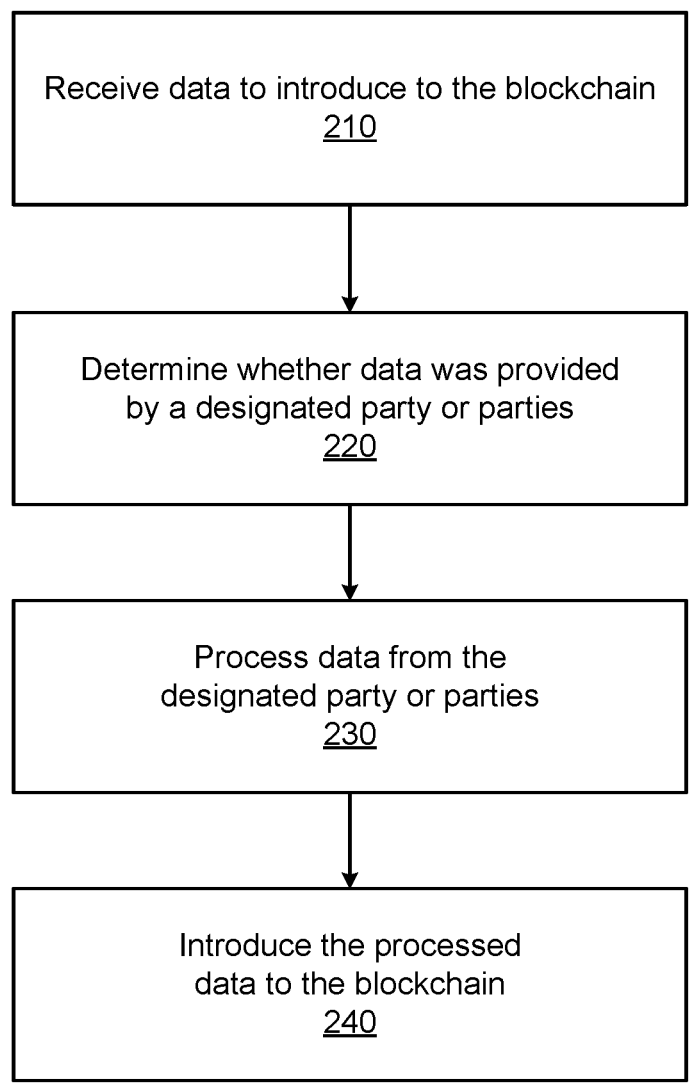
FIG. 2 is a flowchart illustrating a method of introducing data to a blockchain using a DAO-approved oracle, according to one embodiment.

FIG. 2 illustrates a method 200 for introducing data to a blockchain using a DAO-approved oracle. The steps of FIG. 2 are illustrated from the perspective of a distributed ledger node 130 performing the method 200. However, some or all of the steps may be performed by other entities or components. In addition, some embodiments may perform the steps in parallel, perform the steps in different orders, or perform different steps.

In the embodiment shown, the method 200 begins with the distributed ledger node 130 receiving 210 data to introduce to the blockchain (or another type of distributed ledger). The distributed ledger node 130 determines 220 whether the data was provided by a primary party (or primary parties) designated by the DAO to provide oracle data. If so, the distributed ledger node 130 processes 230 the received data. For example, processing may include calculating the mean or some other statistical combination of values received from multiple designated primary parties. The processed data is introduced 240 to the blockchain.

In some embodiments, if the received 210 data is not from a designated primary party, the distributed ledger node 130 checks to see if corresponding data is available from one or more designated primary parties. If there is no corresponding data available from any primary party and/or one or more conditions are met, the distributed ledger node 130 may determine whether the data was received from a designated secondary party and, if so, process the data in a similar manner as if it had been received from a primary party. For example, the distributed ledger node 130 may wait a predetermined amount of time on receiving data from a designated secondary party and if no corresponding data is received from a primary party in that time period, the data from the secondary party may be used. As another example, one or more automated tests may be applied to data provided by a primary party and the data may be rejected in favor of data provided by a secondary party where the data received from the primary party is determined to be wrong (e.g., the value provided is impossible or has a probability less than a threshold) or out of range (e.g., above or below corresponding thresholds that are allowable for data of the relevant type). Where data from a primary party has been rejected in favor of data from a secondary party, the secondary party may continue to provide data to the oracle for a predetermined amount of time, after which the oracle may revert to using data from the primary party. This may, for example, address situations where a primary party data source goes down, allowing smooth failover to a secondary source without permanently rejecting data from the primary source (which may generally be considered to be a more accurate or reliable source).

Figure 3:
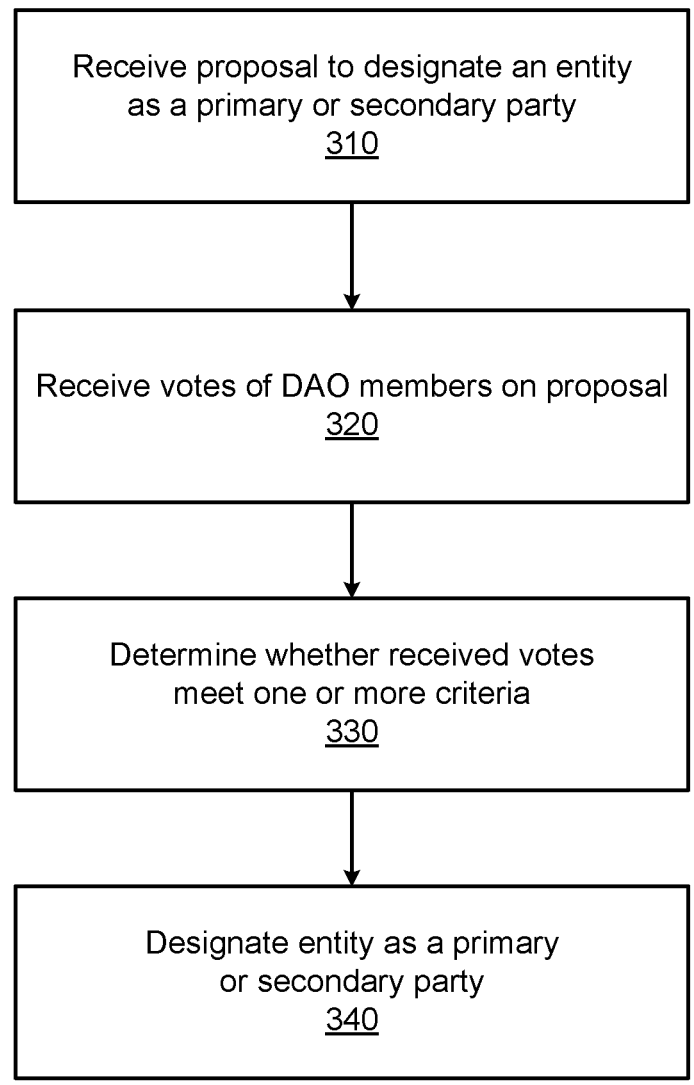
FIG. 3 is a flowchart illustrating a method designating an entity as a primary or secondary party for providing oracle data by a DAO, according to one embodiment.

FIG. 3 illustrates a method 300 for designating an entity as a primary or secondary party, according to one embodiment. The steps of FIG. 3 are illustrated from the perspective of a distributed ledger node 130 performing the method 300. However, some or all of the steps may be performed by other entities or components. In addition, some embodiments may perform the steps in parallel, perform the steps in different orders, or perform different steps.

In the embodiment shown in FIG. 3, the method 300 begins with the distributed ledger node 130 receiving 310 a proposal to designate an entity as a primary or secondary party. The entity may be a member of the DAO. The members of the DAO vote on the proposal and the votes are received 320 by the distributed ledger nodes 130. The distributed ledger node 130 determines 330 whether the received votes meet one or more criteria. For example, approval of the entity may require a threshold amount (e.g., more than half or at least two-thirds) of votes. The votes of members may be equally weighted or member votes may be weighted based on one or more criteria (e.g., in proportion to an amount of value provided by the member to an asset pool of the DAO). Regardless of the precise voting criteria used, if consensus is reached among the distributed ledger node 130 that the criteria have been met, the entity is designated 340 as a primary or secondary party, consistent with the proposal.

Computing System Architecture

Figure 4:
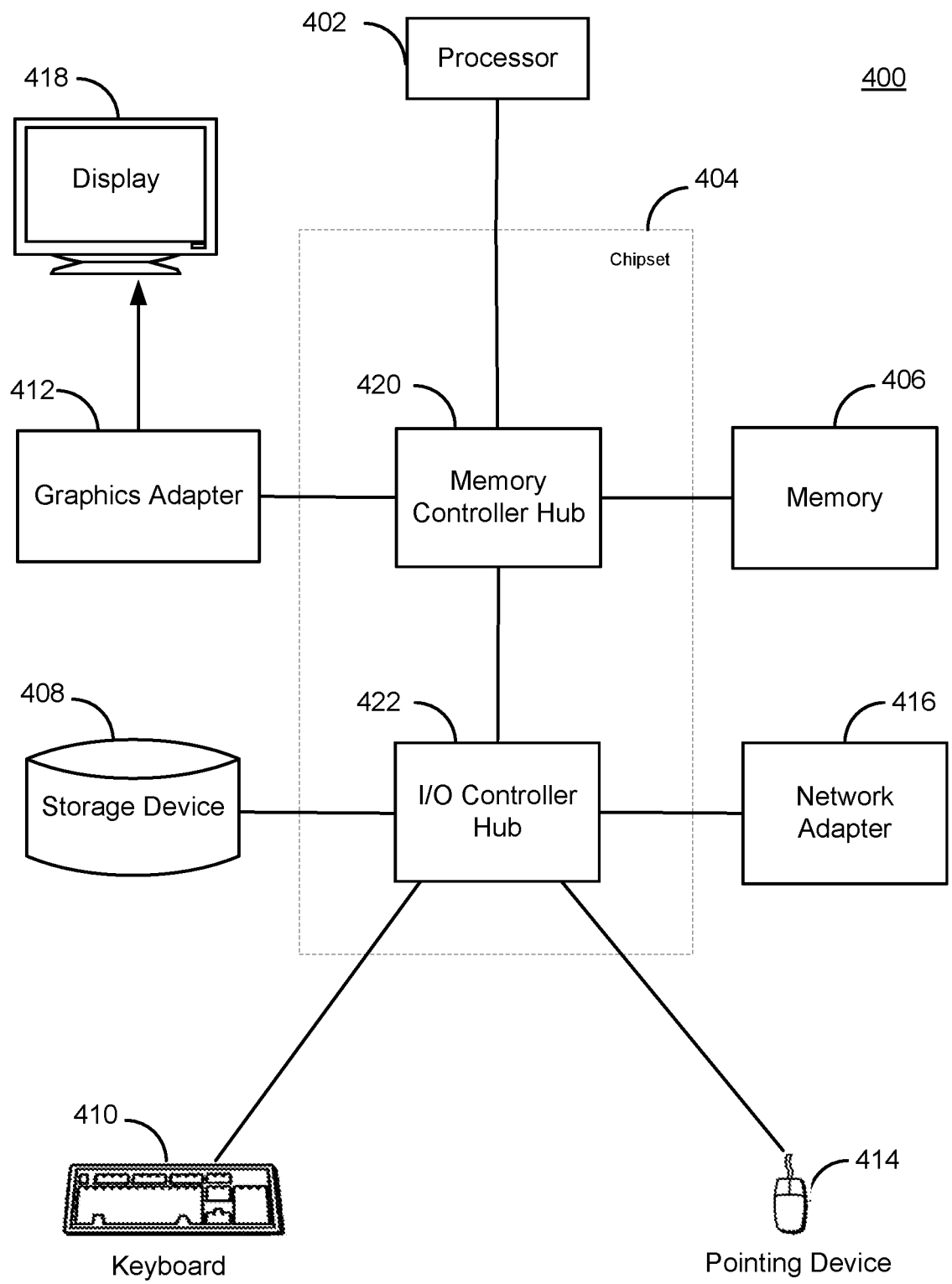
FIG. 4 is a block diagram illustrating an example of a computer suitable for use in the networked computing environment of FIG. 1, according to one embodiment.

FIG. 4 illustrates an example computer 400 suitable for use as a client device 120, distributed ledger node 130, or oracle device 140, according to one embodiment. The example computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, touchscreen, or other type of pointing device, and is used in combination with the keyboard $10 (which may be an on-screen keyboard) to input data into the computer system 400. The graphics adapter 412 displays images and other information on the display 418. The network adapter 416 couples the computer system 400 to one or more computer networks (e.g., network 170). The types of computers used by the entities of FIG. 1 can vary depending upon the embodiment and the processing power required by the entity. Furthermore, the computers can lack some of the components described above, such as keyboards 410, graphics adapters 412, and displays 418.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for a DAO a designate parties to provide oracle data. Thus, while particular embodiments and applications have been illustrated and described, it is to be understood that the described subject matter is not limited to the precise construction and components disclosed. The scope of protection should be limited only by any claims that may ultimately issue.

What is claimed is:

1. A method for creating an oracle on a blockchain which is governed by a decentralized autonomous organization (DAO) that has decision procedures to designate at least one primary party to provide primary oracle data and designate at least one secondary party to provide secondary oracle data responsive to determining that the at least one primary party has failed to provide the primary oracle data in a timely and/or accurate manner, the method comprising:

receiving, from one or more first parties, first oracle data to introduce to the blockchain;

determining that the one or more first parties are designated by the DAO as primary parties responsive to the one or more first parties being designated as primary parties;

processing the first oracle data from the one or more first parties to generate first processed data;

introducing the first processed data to the blockchain;

receiving, from one or more second parties, second oracle data to introduce to the blockchain;

determining that the one or more second parties are designated by the DAO as secondary parties;

determining that the at least one primary party has failed to provide third oracle data that corresponds to the second oracle data during a preceding time period or have previously provided the third oracle data, corresponding to the second oracle data, that was determined to be inaccurate; and responsive to the one or more second parties being designated as secondary parties, and the at least one primary party having failed to provide the third oracle data or having previously provided the third oracle data that was determined to be inaccurate:

processing the second oracle data from the one or more second parties to generate second processed data; and introducing the second processed data to the blockchain.

2. The method of claim 1, wherein the one or more first parties comprises a plurality of first parties and the processing of the first oracle data is an aggregation of the first oracle data received from the plurality of parties.

3. The method of claim 2, wherein the aggregation is a trimmed mean.

4. The method of claim 1, wherein the processing of the first oracle data includes load balancing across data requests and selecting specific primary parties to provide responses to specific requests.

5. The method of claim 1, wherein the DAO maintains performance data on the one or more primary parties as to their timeliness and/or accuracy, wherein the determination that the at least one primary party has failed to provide the third oracle data that corresponds to the second oracle data during a preceding time period or have previously provided the third oracle data corresponding to the second oracle data that was determined to be inaccurate is made based on the performance data.

6. The method of claim 1, wherein the decision procedures of the DAO allow replacement of the at least one secondary party.

7. The method of claim 5, wherein the at least one primary party and the at least one secondary party overlap, but the at least one secondary party does not include a primary party that caused the at least one primary party to fail to provide the third oracle data in a timely and/or accurate manner.

8. The method of claim 1, further comprising determining an accuracy of the first oracle data provided by one of the one or more first parties by applying an automated test that rejects data that is determined to be wrong or out of range.

9. The method of claim 1, wherein the one or more second parties continue to provide the second oracle data for the oracle for a designated recovery period, after which the at least one primary party resumes providing the third oracle data for the oracle.

10. The method of claim 1, wherein membership in the DAO is permissioned.

11. The method of claim 1, wherein the decision procedures of the DAO allow replacement of the at least one primary party.

12. The method of claim 1, wherein the first processed data is introduced to the blockchain in encrypted form and a user authorized by the DAO to access data stored on the blockchain receives a public key of an encryption scheme of the blockchain.

13. The method of claim 12, wherein the user sends a transaction to a smart contract, the transaction including the user's blockchain address in encrypted form using the public key received from the DAO.

14. The method of claim 13, further comprising authenticating, by the smart contract, the transaction by:
using fully homomorphic encryption without errors but with homomorphism into nonstandard operations to compare an encrypted blockchain address included in the transaction that was sent by the user to a blockchain address of a party to the transaction; and
responsive to the encrypted blockchain address matching the blockchain address of the party to the transaction:
accepting the transaction; and
proceeding to a next action, the next action being computed by fully homomorphic encryption without errors but with homomorphism into nonstandard operations from the first processed data and the second processed data on the blockchain, and then decrypted using a known plaintext attack.

15. The method of claim 14, wherein the smart contract includes code that is obfuscated to avoid revealing a choice of homomorphic operations.

16. A non-transitory computer-readable medium storing instructions for creating an oracle on a blockchain which is governed by a decentralized autonomous organization (DAO) that has decision procedures to designate at least one primary party to provide primary oracle data and designate at least one secondary party to provide secondary oracle data responsive to determining that the at least one primary party has failed to provide the primary oracle data in a timely and/or accurate manner, the instructions, when executed, causing a computing system to perform operations comprising:
receiving, from one or more first parties, first oracle data to introduce to the blockchain;
determining that the one or more first parties are designated by the DAO as primary parties;
responsive to the one or more first parties being designated as primary parties:
processing the first oracle data from the one or more first parties to generate first processed data;
introducing the first processed data to the blockchain;
receiving, from one or more second parties, second oracle data to introduce to the blockchain;
determining that the one or more second parties are designated by the DAO as secondary parties;
determining that the at least one primary party has failed to provide third oracle data that corresponds to the second oracle data during a preceding time period or have previously provided the third oracle data, corresponding to the second oracle data, that was determined to be inaccurate; and
responsive to the one or more second parties being designated as secondary parties, and the at least one primary party having failed to provide the third oracle data or having previously provided the third oracle data that was determined to be inaccurate:
processing the second oracle data from the one or more second parties to generate second processed data; and
introducing the second processed data to the blockchain.

17. The non-transitory computer-readable medium of claim 16, wherein the DAO maintains performance data on the one or more primary parties as to their timeliness and/or accuracy, wherein the determination that the at least one primary party has failed to provide the third oracle data that corresponds to the second oracle data during a preceding time period or have previously provided the third oracle data corresponding to the second oracle data that was determined to be inaccurate is made based on the performance data.

18. The non-transitory computer-readable medium of claim 16, wherein the first processed data is introduced to the blockchain in encrypted form, and a user authorized by the DAO to access data stored on the blockchain receives a public key of an encryption scheme of the blockchain, and wherein the operations further comprise:
sending a transaction to a smart contract, the transaction including the user's blockchain address in encrypted form using the public key received from the DAO;
using fully homomorphic encryption without errors but with homomorphism into nonstandard operations to compare an encrypted blockchain address included in the transaction that was sent to the smart contract to a blockchain address of a party to the transaction; and
responsive to the encrypted blockchain address matching the blockchain address of the party to the transaction:
accepting the transaction; and
proceeding to a next action, the next action being computed by fully homomorphic encryption without errors but with homomorphism into nonstandard operations from the first processed data and the second processed data on the blockchain, and then decrypted using a known plaintext attack.

* * * * *